United States Patent [19]

Kluth et al.

[11] Patent Number: 4,508,853

[45] Date of Patent: Apr. 2, 1985

[54] POLYURETHANE PREPOLYMERS BASED ON OLEOCHEMICAL POLYOLS

[75] Inventors: Hermann Kluth, Duesseldorf; Alfred Meffert, Monheim, both of Fed. Rep. of Germany

[73] Assignee: Henkel Kommanditgesellschaft, Duesseldorf, Fed. Rep. of Germany

[21] Appl. No.: 608,322

[22] Filed: May 8, 1984

[30] Foreign Application Priority Data

May 11, 1983 [DE] Fed. Rep. of Germany ....... 3317194

[51] Int. Cl.³ ............................................ C08G 18/34
[52] U.S. Cl. .................................... 521/107; 252/182; 521/129; 521/156; 521/172; 521/173; 524/96; 524/100; 524/247; 524/251; 528/74.5
[58] Field of Search ...................... 528/74.5; 252/182; 524/590, 96, 247, 100, 251; 521/107, 129, 156, 172, 173

[56] References Cited

U.S. PATENT DOCUMENTS 3,699,061 10/1972 Cunningham ..................... 528/74.5

FOREIGN PATENT DOCUMENTS 2045852 3/1971 Fed. Rep. of Germany .
2758114 7/1979 Fed. Rep. of Germany .

OTHER PUBLICATIONS

Saunders & Frisch, "Polyurethanes: Chemistry and Technology", Vol. XVI of High Polymer Series, Interscience Publishers, Part I, (1962), Part II, (1964).
Ser. No. 561,627, 12/15/83, Meffert.

*Primary Examiner*—Maurice J. Welsh
*Attorney, Agent, or Firm*—Ernest G. Szoke; Mark A. Greenfield; Henry E. Millson, Jr.

[57] ABSTRACT

Polyurethane prepolymers containing terminal isocyanate groups in which oleochemical polyols are present as the polyol component. The oleochemical polyols are ring opened products or partial ring-opened products of epoxidized fatty acid triglycerides with alcohols. The use of oleochemical polyols having a residual epoxide number of from 1.0 to 4.0% by weight of epoxide oxygen is preferred. The polyurethane prepolymers are particularly suitable for use in one-component or two-component polyurethane foam formulations.

20 Claims, No Drawings

POLYURETHANE PREPOLYMERS BASED ON OLEOCHEMICAL POLYOLS

BACKGROUND OF THE INVENTION

1. Field of the Invention

This invention relates to polyurethane prepolymers. More particularly, the invention relates to products which can be further processed into polyurethane foams and which are particularly suitable for the formulation of moisture-hardening one-component polyurethane foams.

2. Description of the Prior Art

Polyurethane prepolymers have been known for years. In addition to numerous applications in the adhesives field, they are being used to an increasing extent in the formulation of polyurethane foams. By virtue of their insulating properties, foams such as these have grown in importance in the building industry. So-called one-component polyurethane foams are preferred for use in that field. One-component polyurethane foams are mixtures of polyurethane prepolymers, liquefying agents, accelerators, blowing agents and auxiliaries which are marketed in moisture-proof pressure vessels and which harden on contact with water or water vapor to form solid foams. Thus, according to German Application No. 20 45 852, a product such as this may be produced using a polyurethane prepolymer based on tolylene diisocyanate or crude diphenyl methane diisocyanate and a polyol having a molecular weight of at least 300.

German Application No. 27 58 114 suggests polyurethane prepolymers based on polyesters containing tertiary amino groups and/or polyether polyols containing from 2 to 8 hydroxyl groups for the same purpose.

Hitherto known polyurethane prepolymers are attended by the disadvantage that they do not dissolve conventional blowing agents, such as dichlorodifluoromethane for example, in adequate quantities. This gives rise to problems during the foaming of the mixtures, particularly in the production of lightweight foams for insulating purposes. Another disadvantage lies in the fact that the polyols on which the prepolymers are based are obtained from petroleum, i.e., they are not derived from natural, renewable raw materials. Accordingly, there is a need for polyurethane prepolymers which are based on oleochemical polyols derived from natural raw materials and which show improved solubility for fluorochloro-hydrocarbons.

DESCRIPTION OF THE INVENTION

Accordingly, an object of the present invention is to provide new polyurethane prepolymers based on oleochemical raw materials derived from epoxidized triglycerides of a fatty acid mixture containing at least partly olefinically unsaturated fatty acids. Another object of the present invention is to provide a process for producing the polyurethane prepolymers. The invention also relates to the use of the prepolymers based on oleochemical polyols in the production of polyurethane foams.

In a first embodiment, therefore, the present invention relates to polyurethane prepolymers containing terminal isocyanate groups which are prepared by reacting a stoichiometric excess of aromatic isocyanates containing on average of from 2 to 4 isocyanate groups per molecule with a polyol component which is an oleochemical polyol, optionally containing epoxide groups, and total functionality (OH and epoxide groups) of from 2.0 to 4.0, and which have been produced by the complete or partial ring opening of epoxidized triglycerides of a fatty acid mixture containing at least partly olefinically unsaturated fatty acids with monohydric or polyhydric alcohols.

The present invention also relates to the production of the polyurethane prepolymers. The invention further relates to the use of the new polyurethane prepolymers, optionally in admixture with conventional catalysts (accelerators), liquefying agents, blowing agents, dyes, and/or stabilizers, as starting materials in the production of polyurethane foams.

The polyurethane prepolymers according to the invention are based on aromatic isocyanates containing from 2 to 4 isocyanate groups. Suitable isocyanates of this type contain all the isocyanate groups on one aromatic ring or on several conjugated aromatic rings and can also contain the isocyanate groups on several rings attached to one another through alkylene, for example methylene, groups. Suitable products are, for example, 2,4-tolylene diisocyanate and, especially, 4,4'-diphenylmethane diisocyanate.

It is preferred to use mixtures of 4,4'-diphenylmethane diisocyanates with higher isocyanates, i.e., for example with substituted diphenylmethane diisocyanates which contain as a substituent another aromatic ring containing isocyanate groups. Commercially available, liquid crude mixtures of diphenylmethane diisocyanate, which also contain oligomeric polyphenylene polymethylene polyisocyanates, are particularly preferred. Of these liquid, crude mixtures, those which have an average functionality of from 2 to 2.5 isocyanate groups per molecule are particularly suitable.

It is known to those skilled in the art of polyurethanes that the cross-linkage density and, hence, the hardness and brittleness of polyurethanes increases with the functionality of the isocyanate component or even of that of the polyol. Reference is made here to the general specialist literature, for example, to the work by Saunders and Frisch entitled "Polyurethanes, Chemistry and Technology", Vol, XVI of the High Polymer Series, Interscience Publishers, New York/London, Part I (1962) and Part II (1964).

The polyurethane prepolymers of the invention contain an oleochemical polyol as the polyol component. In the context of the invention, oleochemical polyols are understood to be the reaction products of epoxidized triglycerides of fatty acid mixtures containing at least partly olefinically unsaturated fatty acids with alcohols, preferably $C_1$–$C_3$ alcohols.

In a first embodiment of the invention, prepolymers are produced based on oleochemical polyols which, in addition to hydroxyl groups, also have a residual content of epoxide groups. These starting materials can be produced with advantage by the process described in pending U.S. patent application Ser. No. 561,627 filed Dec. 15, 1983. Such oleochemical polyols are obtained by subjecting epoxidized triglycerides to ring opening with an excess of monohydric or polyhydric alcohol in the presence of an acidic catalyst at temperatures in the range from 50° to 110° C. and terminating the reaction after a conversion of from 20 to 80 mole percent of the epoxide groups has been reached by neutralizing the acidic catalyst and/or by distilling off the alcohol used in excess.

Suitable acidic catalysts include mineral acids, such as sulfuric acid, phosphoric acid, hydrochloric acid, or even organic acids, such as sulfonic acids, for example p-toluene sulfonic acid. The catalytic effect of the acids is eliminated by neutralization. Suitable neutralizing agents are alkali alcoholates, for example sodium methylate.

More specifically, the procedure comprises adding a large excess of alcohol, i.e. for example a 2 to 10 molar excess, based on epoxide groups, to the epoxidized triglyceride. To avoid substantial transesterification, the reaction is then carried out in the presence of the acid catalyst at reaction temperatures in the range from 50° to 110° C. and preferably at reaction temperatures in the range from 60° to 80° C. Where alcohols boiling below 80° C. are used for ring opening, the reaction can be carried out at the boiling point of the particluar alcohol used.

The progress of the reaction can be followed from the epoxide number which can be checked by acid titration, gas chromatography or spectroscopic methods. When the epoxide number has fallen to the required predetermined value, the neutralizing agent is added. Thereafter, the excess of alcohol can be removed if desired by distillation.

Heterogeneous acid catalysts can also be used such as strongly acidic ion exchange resins. After the required residual epoxide number has been reached, the ion exchange resins are separated off from the reaction mixture by filtration.

A reactant, preferably the generally more readily volatile alcohol, can be removed instead of the catalyst. If a reactant is removed, it is preferred to cool the reaction mixture to room temperature or below at the end of the desired reaction time and to remove the alcohol by distillation. Where this procedure is adopted, the catalyst remains in the reaction mixture and can therefore be subsequently used for further reactions.

The oleochemical polyols so produced are modified triglycerides which, in addition to epoxide groups, also contain secondary hydroxyl groups as well as alkyl ether groups. Preferably, at least the greater part, i.e. more than 50%, preferably more than 70% and, in particular, more than 90% of the triglyceride skeleton is retained.

The process for producing oleochemical polyols is preferably carried out with alcohols having a functionality of from 1 to 4 and, more particularly, from 1 to 3; short-chain alcohols being more reactive than long-chain alcohols. Although it is possible to use monofunctional alcohols containing up to 12 carbon atoms, i.e. $C_1$–$C_{12}$ monofunctional alcohols, it is nonetheless preferred to use short-chain monofunctional alcohols, i.e. $C_1$–$C_3$ monofunctional alcohols, such as methanol, ethanol and propanol. Monofunctional secondary alcohols, such as isopropanol, are also suitable.

Unsaturated monofunctional alcohols, such as allyl alcohol, or cyclic monofunctional alcohols, such as cyclohexanol or benzyl alcohol, can also be used. Other suitable alcohols include $C_1$–$C_{12}$ branched alcohols, such as isobutanol or neopentyl alcohol.

In producing the oleochemical polyols, difunctional primary or secondary alcohols can also be used for the ring opening reaction. In this case, it is preferred to carry out the reaction in an excess of alcohol of more than 2 moles and preferably in an excess of from 4 to 8 moles, based on the epoxide groups to be opened. This prevents significant formation of products of relatively high molecular weight through the reaction of each of the 2 hydroxyl groups of the bifunctional alcohol with 1 molecule of epoxidized triglyceride.

Suitable difunctional alcohols include, in particular, ethylene glycol, propylene glycol and their higher homologs. The difunctional alcohols preferably contain from 2 to 8 carbon atoms. The isomeric butane diols, pentane diols, for example, neopentyl glycol, hexane diols, and ring opening products of olefin oxides containing up to 8 carbon atoms can be used. Where these difunctional hydroxy compounds are used for the ring opening reaction, modified triglycerides are formed which, in addition to containing epoxide groups, ether groups, and secondary hydroxyl groups, also contain primary hydroxyl groups.

Another ether group in the oleochemical polyol molecule can be advantageous for certain applications. To achieve this, the ring opening reaction is carried out with the monethers of bifunctional alcohols. Suitable monoethers of bifunctional alcohols contain for example a total of from 3 to 8 carbon atoms and preferably from 3 to 5 carbon atoms. Thus, it is possible to use, for example, ethylene glycol monomethylether, monoethylether, monopropylether and also diethylene glycol or ether of diethylene glycol, as well as the corresponding compounds derived from propylene glycol.

The partial ring opening of epoxidized triglycerides can also be accomplished by trifunctional alcohols containing from 3 to 6 carbon atoms, preferably glycerol or trimethylol propane. Since these alcohols are substantially nonvolatile, they are removed in a high vacuum, for example, in a thin layer evaporator, on completion of the reaction. Through the use of trifunctional alcohols for the ring opening reaction, modified triglycerides are formed which, in addition to epoxide groups and ether groups, contain numerous hydroxyl groups and thus provide a greater degree of hydrophilicity.

Starting materials for oleochemical polyols of the prepolymers according to the invention can be obtained from numerous animal or vegetable triglycerides. The only requirement is that a substantial percentage of epoxide groups should be present.

Thus, suitable epoxidized triglycerides are, for example, those having an epoxide number of from 2 to 10, i.e., those containing from 2 to 10% by weight of epoxide oxygen. Products having an epoxide number of from 4 to 8.5, i.e., containing from 4 to 8.5% by weight of epoxide oxygen, are particularly suitable.

Suitable oleochemical polyols can be produced from the following fats and oils (in order of their starting iodine number): beef tallow, palm oil, lard, castor oil, peanut oil, rapeseed oil and, preferably, cottonseed oil, soya bean oil, train oil, sunflower oil and linseed oil. Particularly preferred substances are epoxidized soya bean oil with an epoxide number of from 5.8 to 6.5, epoxidized sunflower oil with an epoxide number of from 5.6 to 6.6, epoxidized linseed oil with an epoxide number of from 8.2 to 8.6 and epoxidized train oil with an epoxide number of from 6.3 to 6.7.

It is possible by the process for making the oleochemical polyols to produce modified triglycerides which have a high residual content of epoxide groups (approximately 80%) and a low content of hydroxyl and alkyl ether groups (20%). However, it is also possible to obtain products which have a low content of residual epoxide groups (20%) and a high content of hydroxyl and alkyl ether groups (80%) and also any intermediate values.

In some instances, as will be evident to those of ordinary skill in the art, it is desirable that the number of epoxide groups should be substantially equal to the number of hydroxyl and alkyl ether groups. Accordingly, it is preferred to subject from 30 to 70 mole percent of the epoxide groups and, more particularly, from 40 to 60 mole percent of the epoxide groups to the ring opening reaction.

It follows from the foregoing that a large number of oleochemical polyols containing epoxide groups and hydroxyl groups are suitable starting materials for the prepolymers according to the invention. The epoxide number should amount to between 0 and 4.0, i.e., between 0 and 4.0% by weight of epoxide oxygen; and the OH-number should be in the range from 50 to 200 and preferably in the range from 65 to 160. One group of oleochemical polyols useful herein have an epoxide number less than 1, while another group of oleochemical polyols that can also be advantageously used herein have an epoxide number of from 1.0 to 4.0.

In accordance with the above, reaction products of epoxidized triglycerides with alcohols which do not contain any unreacted epoxide groups are suitable starting materials for producing the polyurethane prepolymers according to the invention. Completely ring-opened epoxidized triglycerides such as these can be produced by a process similar to that described above for producing partial ring-opened epoxidized triglycerides. The only difference is that the reaction is continued until all the epoxide groups have been ring-opened.

Suitable starting materials of this type may be obtained from epoxidized triglycerides described above and the alcohols described above. It is preferred to start from epoxidized triglycerides having a lower epoxide number, i.e., in the range from 3.0 to 5.0. Triglycerides such as these can be obtained by the complete epoxidation of triglycerides having relatively low iodine numbers or by the partial oxidation of triglycerides having high iodine numbers. The alcohols already described above are used for the ring-opening reaction.

The polyurethane prepolymers according to the invention contain free isocyanate groups. It is preferred to produce polyurethane prepolymers containing from about 5 to about 25% by weight of free isocyanate groups, based on the weight of the prepolymer. Polyurethane prepolymers containing from about 10 to about 20% by weight of free isocyanate groups, based on the weight of the prepolymer, are particularly preferred.

The reaction between the oleochemical polyol and the isocyanate to form the polyurethane prepolymer is normally carried out at temperatures of up to about 100° C., preferably over a range from room temperature, e.g. 20° C., up to moderately elevated temperatures, such as 50° C. Preferably, the quantity of aromatic isocyanate and oleochemical polyol component corresponds to a starting molar ratio of OH to isocyanate groups of from 1:4 to 1:12, more preferably, 1:4 to 1:11.

To produce the products, the starting materials are mixed while stirring. This may be done in standard, commercially available reaction vessels. To produce polyurethane prepolymers according to the invention for use in reactive one-component polyurethane foams, it is best to mix the oleochemical polyol and the aromatic isocyanate together with effective amounts of any desired additional components, i.e., conventional liquefying agents, accelerators, and blowing agents, in a dry pressurized container, preferably, an aerosol can. Effective amounts of further conventional auxiliaries, such as flame retardant materials, reinforcing fillers and surfactants, may be added either during or after this mixing process. It is also possible to add the blowing agent after production of the prepolymer. One of ordinary skill in the art can readily ascertain effective amounts of these conventional additives without undue experimentation.

The polyurethane prepolymers according to the invention are suitable for numerous applications in the adhesives field. However, they are preferably used in preparations for the production of polyurethane foams. Preparations such as these (one-component systems) consist of polyurethane prepolymers and effective amounts of conventional catalysts (accelerators), conventional liquefying agents (plasticizers) and other conventional auxiliaries which, together with conventional blowing agents, such as gases, are marketed under pressure in aerosol cans.

When the preparation is discharged and relieved of pressure through a pressure valve, a so-called froth foam is formed by evaporation of the blowing agent. Through the free isocyanate groups still present, the froth foam thus formed crosslinks under the effect of atmospheric moisture and may be used for a variety of applications, for example, as a building material.

When they are used in polyurethane foam formulations such as these, the polyurethane prepolymers according to the invention can be employed together with conventional catalysts and catalyst systems, such as those described in the above-mentioned work by Saunders and Frisch, pages 45 et seq. Particularly suitable catalysts are the tertiary amines of the aliphatic tertiary amine type, N-substituted morpholines and N,N'-substituted piperazines, such as (a) aliphatic tertiary amines

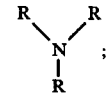

(b) N-substituted morpholines

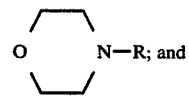

(c) N,N'-substituted piperazines

where R stands most frequently for alkyl or hydroxyalkyl groups containing 1 to 20 carbon atoms. The heterocyclic amine catalysts can possess alkyl substituents on the ring.

In addition, the polyurethane prepolymers of the invention can be used together with conventional liquefying agents or plasticizers, particularly flame-proofing plasticizers, in polyurethane foam formulations. Liquefying agents or plasticizers are normally used in quantities of from about 25 to about 35% by weight, based on oleochemical polyols and auxiliaries.

Conventional liquefying agents which increase the flame resistance of polyurethane foams are phosphorus- and/or halogen-containing compounds, such as diphenyl cresyl phosphate, tris-2-chloroethyl phosphate, tris-2-chloropropyl phosphate and tris-2,3-dibromopropyl phosphate. Other flameproofing agents which can be used are, for example, chlorinated paraffins, halogen phosphates, ammonium phosphate and halogen- and phosphorous-containing resins.

In addition, conventional blowing agents are added in the production of polyurethane foam formulations based on the polyurethane prepolymers of the invention. One particular advantage of the products of the invention lies in their improved solubility for blowing agents. For example dichlorodifluoromethane which, at room temperature and pressure, shows only 20% solubility in conventional polyurethane prepolymers, for example, even those based on castor oil, shows 25 to 28% solubility in the polyurethane prepolymers of the invention.

Suitable blowing agents are substances that are inert to the other components of the reaction mixture. Preferred blowing agents are, for example, halogenated hydrocarbons having boiling points below 30° C. under normal conditions. Suitable hydrocarbons such as these are, for example, monochlorodifluoromethane, dichloromonofluoromethane, dichlorodifluoromethane and/or trichlorofluoromethane. Other suitable blowing agents are readily volatile hydrocarbons, for example propane, isobutane and/or dimethyul ether, and mixtures of the halogenated hydrocarbons and readily volatile non-halogenated hydrocarbons.

Cell regulators, foam stabilizers and other stabilizers, for example, stabilizers against photochemical and/or hydrolytic degration, can be present as further auxiliaries in polyurethane foam formulations containing the polyurethane prepolymers used in accordance with the invention. In addition, dyes can also be used together with the polyurethane prepolymers.

The polyurethane foams obtainable from the polyurethane prepolymers show advantageous properties when tested in accordance with the "Richtlinien zur Prufung von Einkomponenten-Polyurethan-Schaumstoffen (Guidelines for the Testing of One-component Polyurethane Foams)" of the Suddeutsches Kunststoffzentrums, June 1980 (cf. p 7.1/680).

EXAMPLES 1-10

The oleochemical polyols 1-10, listed in Table 1, were produced as follows:

Oleochemical polyol 1-8 and 10 were produced by the method of Example 11 except that the heating step was carried out until the residual epoxide numbers set forth in table 1 were obtained. The heating times used to achieve these epoxide numbers were 95 minutes for the polyol of Example 1, 150 minutes for the polyol of Example 2, and 250 minutes for the polyol of Example 8. In order to obtain the polyols of Examples 3, 4, 5 and 7, the 385 g. of methanol employed in Example 11 was replaced in each instance by 600 g. of ethanol. The resulting mixtures were heated to the reflux temperature of ethanol and maintained at that temperature for 100 minutes for the polyol of Example 3, 200 minutes for the polyol of Example 4, 300 minutes for the polyol of Example 5, and 480 minutes for the polyol of Example 7. In order to obtain the polyol of Example 6, the 385 g. of methanol used in Example 11 was replaced by 800 g. of isopropanol and the resulting mixture refluxed for 300 minutes. In order to prepare the polyol of Example 10, 8 g. of concentrated sulfuric acid were used instead of the 4 g. used in Example 11. In addition, the quantity of sodium methylate solution was doubled and the mixture was stirred at reflux temperature for 300 minutes. All other conditions and ingredients, including quantities thereof, were the same as in Example 11.

Oleochemical polyol 9 was produced by the method of Example 14 except that the epoxidized linseed oil employed as a starting material had an epoxide number in percent by weight of epoxide oxygen of 8.6 and the quantity of methanol used was 150 g. instead of 128 g. All other conditions and quantities of materials were the same as in Example 14.

TABLE I

Oleochemical Polyols

| No. | Starting triglyceride (epoxide No. in % by weight of epoxide oxygen) | Ring opening with | Residual epoxide No. (% by weight of epoxide oxygen) | Hydroxyl No. (calculated) | OH—equivalent weight |
|---|---|---|---|---|---|
| 1 | epoxidized soya bean oil (6.1) | methanol | 3.35 | 85.9 | 652.9 |
| 2 | epoxidized soya bean oil (6.1) | methanol | 1.68 | 138.1 | 406.2 |
| 3 | epoxidized soya bean oil (6.1) | ethanol | 3.91 | 65.3 | 858.9 |
| 4 | epoxidized soya bean oil (6.1) | ethanol | 2.56 | 105.6 | 531.4 |
| 5 | epoxidized soya bean oil (6.1) | ethanol | 1.58 | 134.8 | 416.2 |
| 6 | epoxidized soya bean oil (6.1) | isopropanol | 2.75 | 95.6 | 587.1 |
| 7 | epoxidized soya bean oil (6.1) | ethanol | 0.05 | 181.9 | 308.4 |
| 8 | epoxidized soya bean oil (6.1) | methanol | 1.11 | 155.9 | 359.8 |
| 9 | epoxidized linseed oil (8.6) | methanol | 3.45 | 154.0 | 364.2 |
| 10 | epoxidized soya bean oil (2.75) | methanol | 0.05 | 91.4 | 613.9 |

Production of the pulyurethane foam formulations

The following components were mixed at room temperature:

| | |
|---|---|
| Oleochemical polyol 1 of Table 1 | 66.6 g |
| Tris-(1-chloroisopropyl)-phosphate | 30.0 g |
| Silicone surfactant | 3.0 g |
| Bis-(N,N—dimethylaminoethyl)-ether | 0.4 g |
| Diphenylmethane diisocyanate (Desmodur 44V10, a product of Bayer AG) | 125.0 g |
| Dichlorodifluoromethane | 120.0 g |

Nine further mixtures were prepared in which the 66.6 g of oleochemical polyol were respectively substituted by 66.6 g of oleochemical polyols 2-10 of Table 1. All the mixtures were processed to form excellent polyurethane foams. The blowing agent, dichlorodifluoromethane, was at least largely dissolved.

The ration of OH groups to NCO groups is shown in Table II.

TABLE II

| Polyol No.: | 1 | 2 | 3 | 4 | 5 | 6 | 7 | 8 | 9 | 10 |
|---|---|---|---|---|---|---|---|---|---|---|
| OH Equivalents | 0.102 | 0.164 | 0.077 | 0.125 | 0.160 | 0.113 | 0.216 | 0.185 | 0.183 | 0.108 |
| NCO | 0.922 | 0.922 | 0.922 | 0.922 | 0.922 | 0.922 | 0.922 | 0.922 | 0.922 | 0.922 |
| NCO:OH molar ratio | 9.04:1 | 5.62:1 | 11.97:1 | 7.38:1 | 5.76:1 | 8.16:1 | 4.27:1 | 4.98:1 | 5.04:1 | 8.54:1 |

Examples 11–16 illustrate methods of making the oleochemical polyols useful in the present invention. These Examples also appear in copending application Ser. No. 561,627, filed Dec. 15, 1983.

EXAMPLE 11

1050 g of epoxidized soy oil (6.1% by weight of epoxide oxygen) were heated to reflux temperature with 385 g of methanol and 4 g of concentrated sulfuric acid, followed by stirring for 90 minutes at that temperature. 7.3 g of a 30% sodium methylate solution in methanol were then added, after which excess methanol was removed first at normal pressure and then in vacuo. A modified soy triglyceride containing epoxide groups, hydroxyl, and methyl ether groups was formed. It had a residual epoxide content of 3.26% by weight of epoxide oxygen.

EXAMPLE 12

250 g of ethylene glycol and 1.2 g of concentrated sulfuric acid were heated to 90° C. in a standard apparatus. 1050 g of epoxidized soy oil (6.1% by weight of epoxide oxygen) were added over a period of 20 minutes, with steps being taken to ensure that the temperature did not exceed 100° C. After 30 minutes, the reaction was terminated by the addition of 3.8 g of a 30% solution of sodium methylate in methanol. Excess ethylene glycol was distilled off in vacuo (approximately $10^{-5}$ bars). The product formed had a residual epoxide content of 2.5% by weight of epoxide oxygen.

EXAMPLE 13

96 g of methanol and 0.5 g of concentrated sulfuric acid were heated to boiling temperature in a standard reaction apparatus. 125 g of epoxidized sunflower oil (6.4 by weight of epoxide oxygen) were then added over a period of 30 minutes, followed by heating under reflux (of the boiling methanol) for 4 hours. 0.7 g of a 30% sodium methylate solution in methanol were then added and excess methanol distilled off. The product formed contained 3.6% by weight of epoxide oxygen.

EXAMPLE 14

128 g of methanol and 2 g of concentrated sulfuric acid were heated to boiling temperature in a standard apparatus, followed by the addition over a period of 25 minutes of 380 g of epoxidized linseed oil (8.45% by weight of epoxide oxygen). The mixture was then kept boiling under reflux (of the methanol) for 30 minutes, after which the reaction was terminated by the addition of 3.1 g of a 30% by weight of sodium methylate solution in methanol. Removal of the excess methanol by distillation left a product containing 3.5% by weight of epoxide oxygen.

EXAMPLE 15

96 g of methanol and 0.5 g of sulfuric acid were heated to boiling temperature in a standard apparatus, followed by the addition of 123 g of train oil epoxide (6.5% by weight of epoxide oxygen). The reaction mixture was then left standing for 6 hours at that temperature. Thereafter the catalyst was neutralized by the addition of 0.7 g of a 30% by weight solution of sodium methylate in methanol. Removal of the excess methanol by distillation left a product having a residual epoxide content of 3.87% of epoxide oxygen.

EXAMPLE 16

To determine the degree of transesterification, the procedure described in Example 11 was repeated. On this occasion, however, the ring opening reaction was not terminated, but instead was continued until a complete conversion had been obtained (after about 6 hours). Analysis by gas chromatography revealed a content of approximately 2 to 3% by weight of modified fatty acid methyl esters together with another 5% by weight of volatile constituents.

What is claimed is:

1. A starting material for polyurethane foam comprising: a polyurethane prepolymer containing terminal isocyanate groups comprising the reaction product of (1) a stoichiometric excess of an aromatic isocyanate containing an average of 2 to 4 isocyanate groups per molecule and (2) an oleochemical polyol obtained from the complete or partial ring opening of epoxidized triglycerides of a fatty acid mixture containing at least partly olefinically unsaturated fatty acids with a monohydric or polyhydric alcohol; and an effective amount of a blowing agent, said blowing agent being at least partially soluble in said polyurethane prepolymer.

2. The prepolymer of claim 1, wherein said oleochemical polyol contains epoxide groups.

3. The prepolymer of claim 1, wherein said oleochemical polyol contains no epoxide groups.

4. The prepolymer of claim 1, wherein said aromatic isocyanate is polynuclear and has a functionality of from 2.0 to 3.0.

5. The prepolymer of claim 4, wherein said polynuclear aromatic isocyanate has a functionality of from 2.0 to 2.5.

6. The prepolymer of claim 4, wherein said oleochemical polyol has an OH number of from 50 to 200 and an epoxide number of less than 1.0, said oleochemical polyol being obtained by the complete ring opening of epoxidized triglycerides of a fatty acid mixture containing at least partly olefinically unsaturated fatty acids with at least one alcohol selected from the group consisting of a monofunctional alcohol containing from 1 to 12 carbon atoms and a difunctional alcohol containing from 2 to 8 carbon atoms.

7. The prepolymer of claim 6, wherein said OH number is from 65 to 160.

8. The prepolymer of claim 4, wherein said oleochemical polyol contains residual epoxide groups and has an OH number of from 50 to 200 and an epoxide number of from 1.0 to 4.0, said oleochemical polyol being obtained by the partial ring-opening of epoxidized triglycerides of a fatty acid mixture containing at least partly olefinically unsaturated fatty acids with at least one alcohol selected from the group consisting of a monfunctional alcohol containing from 1 to 12 carbon atoms and a difunctional alcohol containing from 2 to 8 carbon atoms.

9. The prepolymer of claim 1, wherein said oleochemical polyol has an OH number of from 50 to 200 and an epoxide number less than 1.0, said oleochemical polyol being obtained by the complete ring opening of epoxidized triglycerides of a fatty acid mixture containing at least partly olefinically unsaturated fatty acids with at least one alcohol selected from the group consisting of a monfunctional alcohol containing from 1 to 12 carbon atoms and a difunctional alcohol containing from 2 to 8 carbon atoms.

10. The prepolymer of claim 9, wherein said OH number is from 65 to 160.

11. The prepolymer of claim 1, wherein said oleochemical polyol contains residual epoxide groups and has an OH number of from 50 to 200 and an epoxide number of from 1.0 to 4.0, said oleochemical polyol being obtained by the partial ring-opening of epoxidized triglycerides of a fatty acid mixture containing at least partly olefinically unsaturated fatty acids with at least one alcohol selected from the group consisting of a monofunctional alcohol containing from 1 to 12 carbon atoms and a difunctional alcohol containing from 2 to 8 carbon atoms.

12. The prepolymer of claim 1, wherein the quantity of aromatic isocyanate and oleochemical polyol component corresponds to a starting molar ratio of OH to isocyanate groups of from 1:4 to 1:11.

13. A process for producing the polyurethane prepolymer of claim 1, comprising the step of mixing and reacting said stoichiometric excess of said aromatic isocyanate with said oleochemical polyol component at temperatures in the range from 0° to 100° C. to form a polyurethane prepolymer containing terminal isocyanate groups.

14. The process of claim 13 wherein said mixing and reacting are accomplished at temperatures in the range from room temperature to 50° C.

15. The process of claim 13 wherein said reaction occurs in the presence of an effective amount of a polyurethane prepolymer catalyst.

16. The starting material of claim 1 wherein said blowing agent is a chlorinated-fluorinated hydrocarbon.

17. The starting material of claim 1 further comprising effective amounts of (a) a polyurethane foam catalyst, (b) a polyurethane foam liquefying agent, (c) a dye and (d) a stabilizer.

18. A starting material for moisture-hardened one-component polyurethane foam, comprising
 (A) the reaction product of (1) a stoichiometric excess of an aromatic isocyanate containing an average of 2 to 4 isocyanate groups per molecule and (2) an oleochemical polyol obtained from the complete or partial ring opening of epoxidized triglycerides of a fatty acid mixture containing at least partly olefinically unsaturated fatty acids with a monohydric or polyhydric alcohol; and
 (B) effective amounts of (1) a blowing agent selected from the group consisting of chlorinated-fluorinated hydrocarbons, (2) a tertiary amine catalyst and (3) a phosphorus and/or halogen containing liquefying agents.

19. A process of making a polyurethane foam composition comprising:
 (a) producing an oleochemical polyol by the complete or partial ring opening of epoxidized triglycerides of a fatty acid mixture containing at least partly olefinically unsaturated fatty acids with a monohydric or polyhydric alcohol;
 (b) producing a polyurethane prepolymer by reacting said oleochemical polyol with a stoichiometric excess of an aromatic isocyanate containing an average of 2 to 4 isocyanate groups per molecule;
 (c) mixing with said polyurethane prepolymer effective amounts of (i) a blowing agents, said blowing agent being at least partially dissolved in said polyurethane; (ii) a liquefying agent; and (iii) a catalyst;
 (d) evaporating the blowing agent to form a foam; and
 (e) exposing said foam to water whereby a polyurethane foam is produced.

20. The process of claim 19, wherein said blowing agent is a halogenated hydrocarbon; said liquefying agent is a phosphate ester and said catalyst is a tertiary amine.

* * * * *